April 17, 1951     W. A. ULINE ET AL     2,549,725
ELECTRICAL TERMINAL BLOCK
Filed Dec. 10, 1945
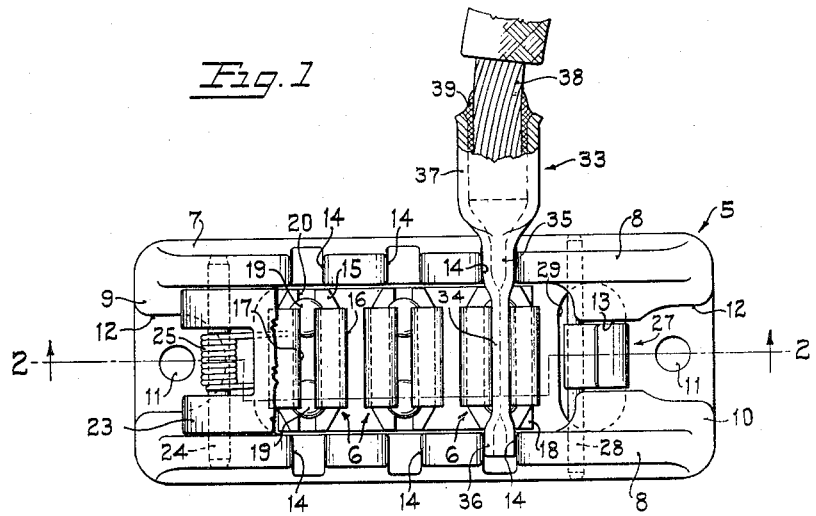
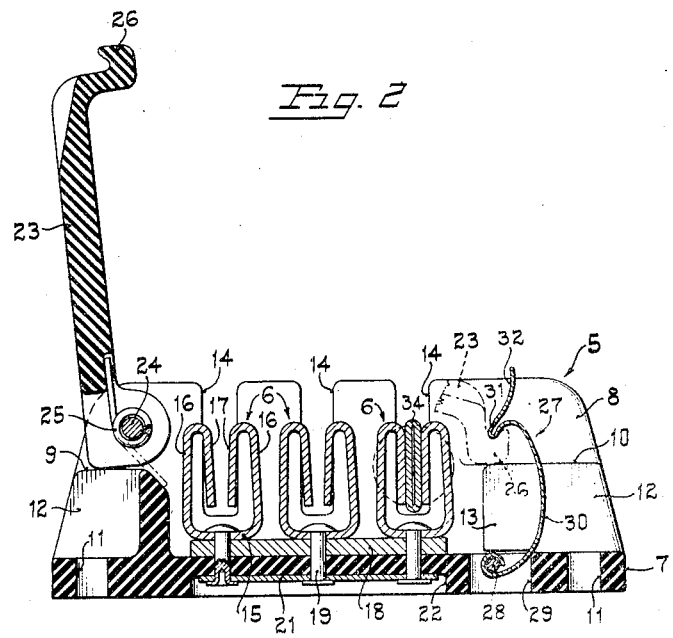
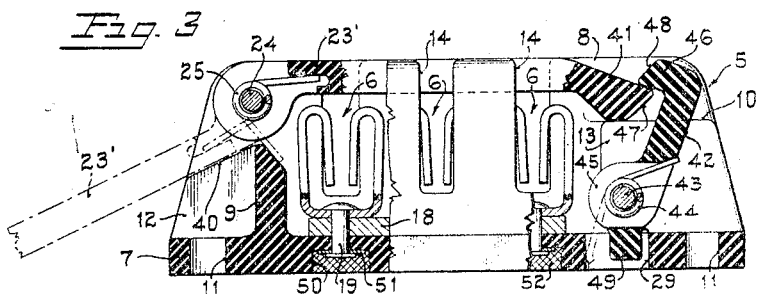
INVENTORS.
William A. Uline
Howard P. Rowell
Dale A. Bauer
ATTORNEY.

Patented Apr. 17, 1951

2,549,725

UNITED STATES PATENT OFFICE 2,549,725

ELECTRICAL TERMINAL BLOCK

William A. Uline and Howard P. Rowell, Sidney, N. Y., assignors to Bendix Aviation Corporation, New York, N. Y., a corporation of Delaware Application December 10, 1945, Serial No. 634,004

3 Claims. (Cl. 173—334)

This invention relates to electrical devices and more particularly to connectors for connecting electrical conductors.

One of the objects of the present invention is to provide a novel connector for receiving and electrically connecting the conductors of two or more electrical devices.

Another object of the invention is to provide a novel connector which is simple in construction, durable and compact for removably receiving the conductor of electrical devices whereby connection and disconnection of the latter may be easily and quickly effected.

A further object is to reduce to a minimum the number of operations and the time spent in installing and removing storage batteries from vehicles or the like through the provision of a novel connector whereby said batteries may be quickly and conveniently connected with and disconnected from a use circuit.

Another object is to provide a novel contact or terminal which is adapted for application on the ends of electrical conductors, and is simple in construction, and inexpensive to manufacture.

Another object is to provide a contact or terminal for conductor ends, which through novel construction thereof is self-locking and thereby held against accidental displacement from an appropriate connector.

Still another object is to provide novel cooperating contacts having low resistance and which are self-cleaning through wiping engagement thereof and easily cleaned by hand.

The above and further objects and novel features of the preesnt invention will more fully appear from the following detailed description when the same is read in connection with the accompanying drawings. It is to be expressly understood, however, that the drawings are for the purpose of illustration only, and are not intended as a definition of the limits of the invention, reference for this latter purpose being had primarily to the appended claims.

In the drawings, wherein like reference characters refer to like parts throughout the several views, Fig. 1 is a top plan view of one form of a connector and conductor terminal constructed in accordance with the present invention, with a portion of said connector broken away for purposes of clearer illustration;

Fig. 2 is a vertical longitudinal section on the line 2—2 of Fig. 1; and

Fig. 3 is a side elevation, partly in section, of another form of connector constructed in accordance with the present invention, with portions thereof broken away for purposes of clearer illustration.

Referring to the drawings, there are shown two novel connectors which, while capable of many uses, are particularly adapted for installation in motor vehicles in order to reduce to a minimum the number of operations and the time spent in installing and removing the storage battery or batteries therefrom for recharging, changeover, and other purposes. With the novel connectors, the storage battery or batteries may be quickly and easily connected with and disconnected from the starting motor and/or other instrumentality, with the result that installation and removal of said batteries is facilitated, whereby a large number of vehicles may be taken care of and released for active service again in a comparatively short time.

Referring first to Figs. 1 and 2 of the drawings, the novel connector illustrated therein comprises a rectangular shaped housing 5 which is molded or otherwise formed of a suitable insulating material, such as, for example, laminated phenolic material, and is adapted to contain a plurality of longitudinally spaced, transversely extending contacts 6 hereinafter described in detail. As shown, housing 5 contains three contacts 6, but it is to be understood that the number of contacts employed may be varied as desired, with a corresponding change in the size of said housing. Housing 5 is formed with a flat plate-like base 7, two upstanding thin side walls 8, 8, and two thick end walls 9 and 10 which extend upwardly approximately one-half the height of said side walls. The base 7, side walls 8, 8, and end walls 9 and 10 form a box-like structure which may be secured to any suitable support by passing bolts through openings 11 provided in opposite ends of base 7 for this purpose, the end walls 9 and 10 being provided with pockets 12 to receive the heads of said bolts, and the end wall 10 being further provided centrally thereof with a longitudinally extending slot 13 for a purpose to be hereinafter described. The side walls 8, 8, of housing 5 are formed with a plurality of longitudinally spaced, transversely aligned slots 14, three being shown in each wall corresponding to the number of contacts 6, said slots opening outwardly through the upper ends of said side walls and extending downwardly to a point spaced from the upper surface of base 7.

The longitudinally spaced, transversely extending contacts 6 contained within housing 5 are of the clip-type and are formed of a suitable, resilient, electrically conductive material such as, for example, semi-hard copper. As shown, each contact consists of a horizontal bar portion 15 having two upwardly bent spaced strip portions 16, 16 which terminate in two inwardly and downwardly bent strip portions 17, 17 spaced from the portions 16, 16 and from each other in converging relation, the space between portions 17, 17 being less than the width of slots 14. By virtue of the double portions 16 and 17, each contact 6 is of double tension and will not set and lose its effectiveness after a short period of use, thus assuring uniform contact pressure over the necessary large area of said contact, and good electrical contact at all times and for an indefinite period.

Contacts 6 are arranged within housing 5 in transverse alignment with the paired slots 14 in side walls 8, 8 and are electrically connected together by a rectangular plate 18 of a suitable electrically conductive material, such as, for example, hard copper, disposed between said contacts and the upper surface of base 7. Contacts 6 and plate 18 are rigidly secured to base 7 and within housing 5 by semi-tubular rivets 19 of a suitable electrically conductive material, such as, for example, brass, which extend through slots 20 formed in the opposite ends of the bar portions 15 of said contacts and opening outwardly through said ends to receive said rivets. Rivets 19 project downwardly from contacts 6 through suitable openings formed in the plate 18 and in the base 7 of housing 5, and are riveted or spun over against a thin rectangular plate 21 of a suitable electrically conductive material, such as, for example, brass, which is disposed within a rectangular recess 22 formed in the underside of base 7. Contacts 6 are thus rigidly held in housing 5 and in contact with plate 18 by rivets 19, and are electrically connected through said plate and also through said rivets and the plate 21. It will be understood that since the contacts 6 are electrically connected primarily by plate 18, a plate of non-conducting material may be substituted for the plate 21.

Housing 5 is provided with a cover 23 which is molded or otherwise formed of a suitable insulating material, such as, for example, laminated phenolic material, and acts, when in closed position, to shield the contacts 6 and to prevent upward accidental displacement therefrom of the individual conductor terminals to be hereinafter described. Cover 23 is pivotally mounted on a pin 24 which is secured in any suitable manner in the side walls 8, 8 of housing 5 at a point above the end wall 9 of said housing and extends loosely through the bifurcated end of said cover. Cover 23 is normally biased toward open or raised position, as shown in full lines in Fig. 2, by resilient means, such as, a torsion spring 25 which encircles the exposed portion of pin 24 and has one end engaged with said cover and the opposite end engaged with the end wall 9 of housing 5. Spring 25 may be utilized to retain pin 24 in housing 5 by restricting an end coil thereof and engaging the same in an annular groove formed in the exposed portion of said pin. Upward movement of cover 23 by spring 25 is limited to a substantially vertical position through engagement of the square end of said cover with the upper surface of end wall 9. The opposite or free end of cover 23 is formed with a depending hook portion 26 which is adapted to engage the upper surface of end wall 10 of housing 5 when said cover is in closed position and slightly spaced from the contacts 6, as shown in the broken lines in Fig. 2.

Cover 23 is releasably held in closed position and against the raising efforts of spring 25 by a resilient latch member or clamp 27 which extends upwardly from base 7 through the slot 13 in end wall 10, and is pivotally mounted on a pin 28 that is secured in said base and extends across an elongated transverse opening 29 into which the lower end of said clamp extends. Clamp 27 is formed of a suitable resilient material, such as, for example, spring steel, and consists of a curved or bowed lower body portion 30, an intermediate inwardly projecting nose or detent portion 31 which is adapted to engage the upper side of hook portion 26 of cover 23, and a curved upper end portion 32 by which the clamp 27 may be manually released from said cover. The curved upper end portion 32 of clamp 27 provides in effect a cam surface, whereby said clamp may be cammed or flexed toward the right, as viewed in Fig. 2, out of clamping position by the hook portion 26 of cover 23 upon downward movement of the latter to closed position, whereupon the detent portion 31 of clamp 27 will snap over the hook portion 26 of cover 23 and automatically clamp the latter in closed position. The curvature of the body portion 30 of clamp 27 is so designed and proportioned that it contacts one side of the opening 29 in base 7 with said clamp in cover clamping position, as shown in Fig. 2. In this manner, clamp 27 will be maintained in cover clamping position and under tension to automatically and firmly clamp cover 23 in closed position, and cannot be released without applying pressure thereon.

In actual use, the described three-contact connector is capable of receiving and electrically connecting three conductors. These conductors may be, for example, the live conductors or cables of two storage batteries and a third conductor for connecting the storage batteries in parallel with a use circuit, such as, the starting motor, or the live conductor or cable of one storage battery only and one or two other conductors for connecting said storage battery with one or two use circuits. It will be apparent that the three-contact connector may be employed for other uses, such as, for electrically interconnecting two or three individual electrically operated devices, and that any number of devices may be electrically interconnected by increasing the number of contacts 6.

In accordance with the present invention, a novel contact or terminal is provided for application on the ends of the various conductors and for use in combination with the hereinbefore described connector. As presently will appear, the novel contact or terminal is simple in construction, it may be easily and inexpensively manufactured, and it is self-locking when inserted between the portions 17, 17 of the contacts 6. As shown, the novel contact or terminal indicated generally at 33 is formed of a suitable electrically conductive material, such as, for example, annealed copper, and comprises a flat knife-like portion 34 of a length greater than the length of contacts 6 and of a thickness slightly greater than the distance between the spaced portions 17, 17 of said contacts. The knife-like portion 34 of terminal 33 is provided at opposite ends thereof with flat portions 35 and 36, both of which are of a thickness greater than the thickness of the portion 34 and slightly less than the width of the slots 14 in side walls 8, 8 of housing 5 so as to extend into said slots when the portion 34 is inserted between the spaced portions 17, 17 of contacts 6. The flat portion 35 of terminal 33 terminates in a tubular end portion 37 for receiving the bared end of a conductor 38. The terminal 33 may be soldered to the conductor 38 as indicated at 39, or it may be swedged thereon as desired.

The described terminal 33 may be fabricated from a solid flat or round piece of electrically conductive material by machining the same to form the portions 34, 35, and 36, and drilling one end for reception of the conductor 38. This method, however, is expensive and slow, resulting in a high manufacturing cost and low production rate. In accordance with the present invention, the terminal 33 is fabricated in a novel manner which eliminates all machining operations, thus facilitating manufacturing of said terminal whereby a high rate of production may be obtained at comparatively low manufacturing cost.

In making the described terminal 33 in accordance with the present invention, a straight single piece of electrically conductive tubular stock, such as, annealed seamless copper tubing of the proper length and outside and inside diameters, is subjected to external pressure applied thereon hydraulically or mechanically at diametrically opposite points by suitable dies, whereby diametrically opposite side portions of the tube are compressed until they contact each other, or substantially so, thus forming the flat knife-like portions 34. At the same time, portions of the tube at opposite ends of the portion 34 are subjected to external pressure, but compressed a lesser extent, thus forming the enlarged flat portions 35 and 36. The remaining portion of the tube is left untouched, thus providing the tubular end portion 37 for reception of the conductor 38. It will thus appear that the described terminal 33 is fabricated from tubular stock and in one operation by merely pressing diametrically opposite side portions of said tube together. Manufacture of the terminal 33 is thus facilitated resulting in low manufacturing cost and a high production rate. The terminal 33 thus formed may be applied to conductors of various diameters that will fit into the tubular end portion 37. The same terminal may also be applied to conductors of larger diameters by expanding the tubular end portion 37 to increase the internal diameter thereof by inserting therein a plunger of the proper diameter which also acts to flare the end of said portion.

When inserting a terminal 33 in the described connector, the clamp 27 is manually released, whereupon cover 23 springs open under the action of spring 25 to the position shown in full lines in Fig. 2. The terminal 33 is then inserted edgewise through the upper open of housing 5 in a manner so that the flat knife-like portion 34 of said terminal is positioned between and gripped by the spaced strip portions 17, 17 of the contact 6, and the enlarged flat portions 35 and 36 are positioned in the slots 14 in side walls 8, 8 of housing 5 and at opposite ends of said contact. Thereafter, the cover 23 is closed and locked in closed position by the clamp 27. It will be noted that when the terminal 33 is connected with the contact 6, axial withdrawal of said terminal from said contact and housing 5 through slots 14 is prevented by the enlarged flat portions 35 and 36, and that when the cover 23 is closed and clamped in closed position by clamp 27, the underside of said cover is positioned in close proximity to the upper ends of contacts 6, thus preventing upward edgewise displacement of terminals 33 from contacts 6. It will also be noted that rotation of the terminal 33 relatively to contact 6 is prevented through engagement of the enlarged flat portions 35, 36 in slots 14, thereby preventing overstressing of said contact.

The structure of the connector embodying the present invention may be modified in accordance with the illustration of Fig. 3 wherein the upper surface of the end wall 9 of housing 5 is inclined as indicated at 40, and the square corner on the end of cover 23' adjacent to its pivot 24 is eliminated so as to enable said cover, upon opening of same by spring 25, to swing beyond vertical and horizontal positions and into engagement with the inclined surface 40, or stop on surface upon which base 7 is mounted, as shown in broken lines in Fig. 3, thus presenting a clear unobstructed space above housing 5. The free end of cover 23' extends downwardly at an angle, as indicated at 41, so as to engage the upper surface of the end wall 10 of housing 5 and provide a small clearance space between the contacts 6 and said cover when the latter is in closed position. Cover 23' is clamped in closed position by a spring-loaded rigid latch member or clamp 42 pivotally mounted on a pin 43 which is secured in any suitable manner in housing 5 at a point above the upper surface of base 7 and extends through the side walls 8, 8 and end wall 10 of said housing. The spring 44 for normally biasing clamp 42 toward cover clamping position is a torsion spring which is disposed within a slot 45 formed in said clamp and encircles the exposed portion of pin 43. One end of spring 44 engages clamp 42, and the opposite end of said spring projects downwardly from pin 43 into the transverse slot 29 in base 7 and engages one side of said slot. Clamp 42 may be made of any suitable material and in any suitable manner, but as herein shown, is preferably moulded of a suitable insulating material, such as, laminated phenolic material.

Clamp 42 extends upwardly from pivot pin 43 through the slot 13 in end wall 10, and is formed at its upper end with an inwardly projecting right angle portion 46 providing a hook which is adapted to extend over and engage the angular end 41 of cover 23' when the latter is in closed position, as shown in full lines in Fig. 3. The free edges of the cover portion 41 and hook 46 of clamp 42 are similarly bevelled as indicated at 47 and 48, respectively, forming cooperating cam surfaces whereby said clamp will be cammed out of clamping position against the tension of spring 44 upon downward movement of cover 23' and engagement of the end 41 thereof with hook 46, and thereafter snap over said cover when the latter engages the upper surface of the end wall 10. Movement of clamp 42 out of cover clamping position is limited by a lug or ear 49 formed integrally with said clamp and extending downwardly therefrom into the slot 29 in base 7. Lug 49 is of a length so that it will engage a side wall of slot 29 when clamp 42 is moved manually out of engagement with cover 23' and reaches a predetermined position, thus preventing further movement of said clamp.

In the embodiment illustrated in Fig. 3, the rivets 19 for securing the contacts 6 and connecting plate 18 to housing 5, extend through base 7 into separate annular recesses 50 formed in the underside of said base, and are riveted over against thin washers 51 contained within said recesses and engaged over said rivets. In order to insulate the rivets 19 from any grounded object that might come into contact with said rivets, the recesses 51 are preferably sealed by filling the same with sealing wax as indicated at 52. Except for the above-described differences, the construction and operation of the connector illustrated in Fig. 3 is the same as the construction and operation of the connector illustrated in Figs. 1 and 2 and, therefore, needs no further detailed description herein.

There is thus provided a novel connector which has particular utility in the automotive field, whereby storage batteries in motor vehicles, busses, trucks, and the like, may, by the use of said connector, be quickly connected with and disconnected from the starting motor or other instrumentality in order to facilitate installation and removal of said batteries from said vehicles for recharging, changeover, and other purposes. The novel connector reduces to a minimum the number of operations and the time heretofore required for this purpose, with the result that a large number of vehicles may be taken care of and released for active service again within a comparatively short period. The novel connector may also be employed for connecting batteries to charging circuits in service stations, and for connecting any circuit involving large currents; plating generator circuits and the like. There is also provided a novel self-locking conductor terminal for use with the described novel connector, and which may be made to accommodate any size of cable for use in connecting any and all types of electrical circuits. There is further provided a novel method of fabricating said terminal whereby all machining operations are eliminated resulting in a low manufacturing cost and a high production rate.

Although only two modifications of the invention have been illustrated in the accompanying drawings and described in the foregoing specification, it is to be expressely understood that the invention is not limited to said modifications or to the particular use thereof. It will be apparent that the invention may be employed in other fields wherein the ability to quickly connect and disconnect two or more electrical devices for installation, removal and other purposes is desirable. Various changes, particularly in the design and arrangement of the parts illustrated, may be made without departing from the spirit and scope of the invention as will now be apparent to those skilled in the art. For a definition of the limits of the invention, reference is had primarily to the appended claims.

What is claimed is:

1. In a device of the character described, a box-like structure formed of insulating material and having a base and a pair of side walls, said side walls being provided with a plurality of longitudinally spaced vertically extending slots arranged in transversely aligned pairs and opening outwardly through the upper edges of said side walls, a plurality of electrically connected contacts secured to said base, each of said contacts comprising at least two spaced vertically extending resilient strips of electrically conductive material extending transversely of said base in alignment with a pair of said slots, and a conductor terminal adapted to be electrically connected with said contacts through the upper open ends of said slots, said terminal comprising a member having a flat elongated knife-like portion engageable between said spaced contact strips and provided at each end thereof with enlarged portions for preventing axial displacement of said terminal from the contact engaged thereby.

2. A connector comprising a housing formed of insulating material and having a base and a pair of side walls, said side walls being provided with a plurality of longitudinally spaced vertically extending slots arranged in transversely aligned pairs and opening outwardly through the upper edges of said side walls, a plurality of electrically connected contacts secured in said housing to said base, each of said contacts comprising at least two vertically extending resilient strips of electrically conductive material extending transversely of said housing in alignment with a pair of said slots, said strips being spaced a distance less than the width of said slots, and a conductor terminal adapted to be electrically connected with said contacts through the upper open ends of said slots, said terminal comprising a member having a flat elongated knife-like portion engageable between said spaced contact strips and provided at opposite ends thereof with enlarged flat portions engageable in said slots for preventing relative rotation and axial displacement of said terminal from the contact engaged thereby.

3. In a device of the character described, a housing formed of insulating material and having a base and a pair of side walls, said side walls being provided with a plurality of longitudinally spaced vertically extending slots arranged in transversely aligned pairs and opening outwardly through the upper edges of said side walls, a plurality of electrically connected clip-type contacts secured to said base and extending transversely thereof in alignment with said pairs of slots, each of said contacts being formed of resilient electrically conductive material and comprising a horizontal portion and two spaced upwardly bent portions terminating in two inwardly and downwardly bent portions spaced from each other and from said upwardly bent portions, the space between said downwardly bent portions being less than the width of said slots, a conductor terminal adapted to be electrically connected with said contacts through the upper open ends of said slots, said terminal comprising a member having a flat elongated knife-like portion engageable between the downwardly bent portions of said contacts and provided at opposite ends thereof with enlarged flat portions engageable in said slots for preventing relative rotation and axial displacement of said terminal from the contact engaged thereby, a cover of insulating material pivotally mounted at one end thereof on said housing and adapted when in closed position to extend over and in close proximity to said contacts and the conductor terminals connected therewith, resilient means biasing said cover toward open position, and releasable means carried by said housing for releasably holding said cover in closed position.

WILLIAM A. ULINE.
HOWARD P. ROWELL.

(References on following page)

REFERENCES CITED

The following references are of record in the file of this patent:

UNITED STATES PATENTS

| Number | Name | Date |
|---|---|---|
| 514,305 | Clift | Feb. 6, 1894 |
| 1,023,326 | Murray | Apr. 16, 1912 |
| 1,104,436 | Menningen | July 21, 1914 |
| 1,210,176 | Knapp | Dec. 26, 1916 |
| 1,260,592 | Sturgeon | Mar. 26, 1918 |
| 1,568,584 | Blankenship | Jan. 5, 1926 |
| 1,659,303 | Rovere | Feb. 14, 1928 |
| 1,815,233 | Burke | July 21, 1931 |
| 2,071,948 | Peters | Feb. 23, 1937 |
| 2,126,183 | Frank | Aug. 8, 1938 |
| 2,276,140 | Andren | Mar. 10, 1942 |
| 2,281,515 | Ruggieri | Apr. 28, 1942 |
| 2,339,174 | Kosha | Jan. 11, 1944 |
| 2,402,578 | Rollow | June 25, 1946 |
| 2,424,966 | Buchanan | Aug. 5, 1947 |
| 2,450,202 | Macy | Sept. 28, 1948 |

FOREIGN PATENTS

| Number | Country | Date |
|---|---|---|
| 125,121 | Austria | Oct. 26, 1931 |